United States Patent [19]

Moore

[11] 4,003,337
[45] Jan. 18, 1977

[54] FISH GROWING TANK AND METHOD

[76] Inventor: Kerry Lamar Moore, 2215 Ann, Monroe, La. 71201

[22] Filed: Oct. 23, 1974

[21] Appl. No.: 517,033

[52] U.S. Cl. ................................................. 119/3
[51] Int. Cl.² ...................................... A01K 61/00
[58] Field of Search ................................. 119/2–5

[56] References Cited

UNITED STATES PATENTS

| | | | |
|---|---|---|---|
| 3,116,712 | 1/1964 | Ogden | 119/2 |
| 3,166,043 | 1/1965 | Castillo | 119/3 |
| 3,773,014 | 11/1973 | Ewald | 119/3 |

*Primary Examiner*—Louis G. Mancene
*Assistant Examiner*—Peter K. Skiff
*Attorney, Agent, or Firm*—Howard E. Moore; Gerald G. Crutsinger

[57] ABSTRACT

Method and apparatus to grow aquatic life forms, such as different species of fish or shell fish, having concentrically arranged tanks of an appropriate volume to provide an optimum rate of growth of the fish in each stage of their life. The tanks are arranged in surrounding relationship to each other and are successively larger from the inside out so that the fish may be transferred to the next larger tank without physical handling when they have reached their optimum growth for the tank in which they are disposed. Apparatus is provided to circulate water through the tanks and to control the temperature thereof to thereby provide a healthy environment for maximum growth rate of the fish.

2 Claims, 2 Drawing Figures

FISH GROWING TANK AND METHOD

BACKGROUND OF THE INVENTION

Many fish are commercially produced in hatcheries and fish stock farms because under a controlled environment and feeding they may grow faster and are of better quality. It has been found that the rate of growth of fish as compared to the volume of the habitant in which they are grown is directly proportional thereto. Thus, the fish placed in a tank of a given volume will grow to just a certain maximum size within that tank and unless placed in a larger tank will not grow any larger.

Small fish when placed in with larger fish are unable to defend themselves and are often eaten or are casualties of fights with the larger fish. Thus, it is desirable that fish of the same size be placed in one tank.

Heretofore the transfer of fish from a smaller tank to a larger tank has involved the use of one's hands or a net to transfer them often resulting in the bruising or other injury to the fish in the transfer procedure. When a fish is injured it may die or its rate of growth is decreased until such injury has healed. The injury or killing of fish in this process reduces the efficiency of production and the quality of fish produced.

This invention utilizes the phenomena that fish may be herded or driven much the same as cattle by creating a splash or other motion behind them, thus permitting them to be herded from one tank to the other without manual handling.

SUMMARY OF THE INVENTION

I have devised a method and apparatus for raising fish which provides concentrically arranged tanks of graduated volume to stimulate an optimum rate of growth of the fish. The adjacent tanks are successively larger in volume from the inside out and have doors therebetween so that the fish may be transferred to successively larger tanks as they grow without physically handling them.

The primary object of the invention is to maximize the rate of growth and quality of domestically raised fish so as to produce a maximum number of fish of a specified size in a specified volume of water.

Another object of the invention is to provide a method and means of raising fish wherein the fish are transferred to successively larger tanks without physically handling them.

A further object of the invention is to provide an arrangement of successively larger fish raising tanks to maximize the volume of the tanks while at the same time minimizing the ground area required for building said tanks.

A still further object of the invention is to provide a volumetric environment precisely adjusted to the growth rate of each species of aquatic life.

A still further object of the invention is to provide a means of monitoring the growth of fish during the growing cycle.

Other and further objects of the invention will become apparent upon reading the detailed description hereinafter following and by referring to the drawings annexed hereto.

DESCRIPTION OF THE DRAWINGS

Drawings of a preferred embodiment of the invention are annexed hereto so that the invention may be better and more fully understood, in which.

Numeral references are employed to designate parts shown in the drawings and like numerals designate like parts throughout the various figures of the drawings.

DESCRIPTION OF A PREFERRED EMBODIMENT

Figure 1:
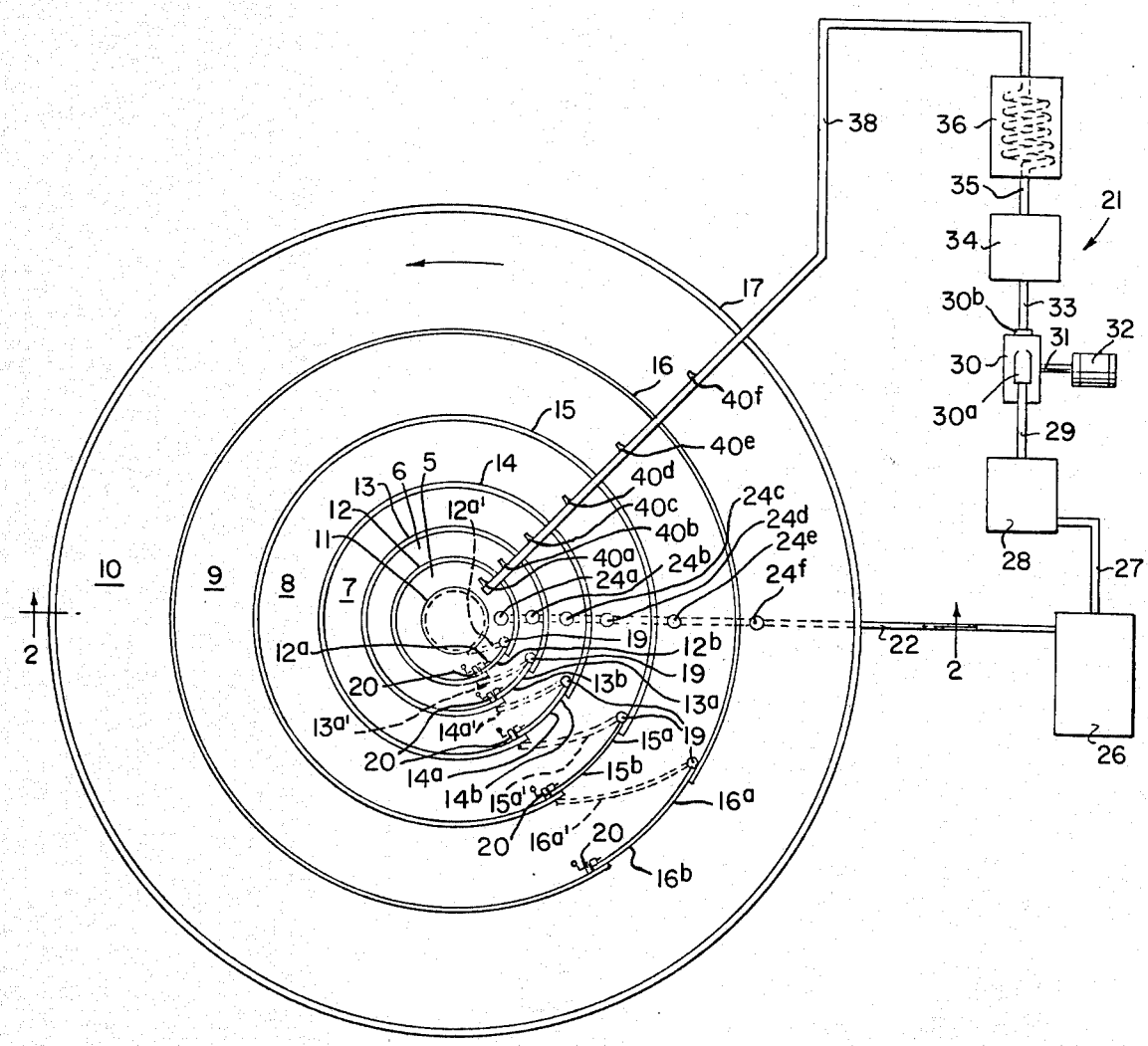
FIG. 1 is a plan view of the tanks with a diagrammatic view of the environmental support system.
Figure 2:
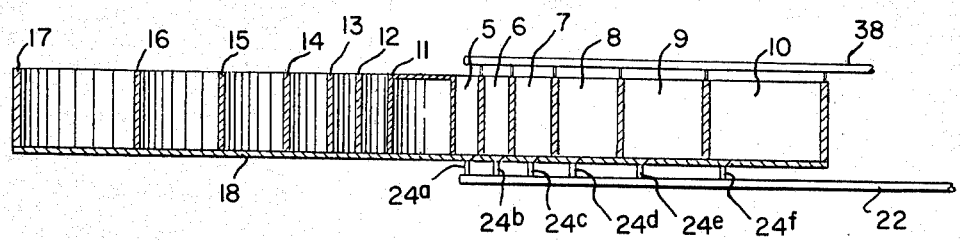
FIG. 2 is a cross-sectional view taken along line 2—2 of FIG. 1.

Referring to FIG. 1 of the drawings the apparatus comprises a plurality of compartments 5, 6, 7, 8, 9 and 10 divided by concentric circular tank walls 11, 12, 13, 14, 15, 16 and 17 and having a bottom 18 common to the compartments 5–10. Each of the tank walls 12–16 has a door 12a–16a pivotally secured over openings 12b–16b formed in the walls 12–16, respectively. The doors 12a–16a are pivotally secured by hinges 19 to walls 12–16 and are openable to the positions shown in dashed outline 12a'–16a' and may be secured in the closed position by latches 20.

Tank walls 11–17 are preferably spaced such that the volume of each compartment is two times the volume of the compartment about which it extends. For example, assuming the volume of compartment 5 is V, the volume of compartment 6 is 2V; the volume of compartment 7 is 4V; the volume of compartment 8 is 8V; the volume of compartment 9 is 16V; and the volume of compartment 10 is 32V. However, it will be understood that the compartments may be of such relative progressively greater volumes from the innermost out as required to accommodate the growth pattern of the particular form of aquatic life grown in the compartments. This geometric design of concentric tanks provides proportionally increasingly larger concentric compartments to provide for the maximum growth rate of the fish at each stage of their life. In addition the compartments inner-communicate such that the fish may be herded from compartment to compartment at each stage of their growth without physically handling them.

Fingerlings are placed in compartment 5 until they reach maximum size for the volume of compartment 5, then they may be herded into compartment 6 through opening 12b.

When the door 12a is open to position 12a', the door 12a provides a barrier transverse to walls 11 and 12, forcing the fish to go through opening 12b when they are herded toward door 12a.

Environmental support means 21 is provided comprising a return conduit 22, positioned under the compartments 5–10, which has drain passages 24a–24f extending through bottom 18 and communicating with each of the compartments 5–10. Return conduit 22 is secured to the inlet side of a sediment separation tank 26 to remove relatively large foreign objects from the water. A conduit 27 is connected from the discharge side of the separation tank 26 to the inlet of filter tank 28 which filters smaller foreign particles from the water.

Conduit 29 connects the discharge side of filter tank 28 to the suction side 30a of pump 30 which is connected to the drive shaft 31 of motor 32. The pump 30 circulates the water throughout the environmental control means 21 and through the respective tanks 5–10.

Conduit 33 is connected to the pressure side 30b of pump 30 and water is pumped into the inlet side of an aeration tank 34 where air is diffused into the water so that the fish may be supplied with adequate oxygen.

Conduit 35 is connected to the discharge side of aeration tank 34 and is connected to a temperature control means such as a heat exchanger coil 36. Heat may be transferred to the coil 36 from any suitable source such as an electrical heating element or an open flame (not shown). It should be appreciated that coil 36 may be cooled by circulating refrigerant over the surface thereof.

The water is discharged from supply line 38 extending across upper edges of tank walls 12, 13, 14, 15, 16 and 17, through directional discharge nozzles 40a–40f into compartments 5–10. The water is directed away from drain passages 24a–24f to maintain water circulation in a counter-clockwise direction, as viewed in FIG. 1, through annular compartments 5–10 toward drain passages 24a–24f; thus, providing constant movement of the water through each compartment and maintaining a clean, healthy environment for the aquatic life.

The operation of the apparatus hereinbefore described is as follows:

Fingerlings or other small aquatic life forms to be cultivated are taken from a hatchery and placed in innermost tank 5. When the fish or other aquatic animals have grown to a maximum size for the volumetric environment of compartment 5, gate 12a is unlatched and pivoted to position 12a' and the fish are herded from behind gate 12a, through opening 12b, and into compartment 6. This may be done by placing a paddle or the like (not shown) behind the fish and moving same toward the open gate 12a and the fish will be directed through passage 12b.

It should be readily apparent that due to the separation of different sizes of fish, that the fish will grow much faster and will be unmolested and undamaged by the larger fish. Upon removal of the fingerlings from tank 5, new fingerlings are placed therein and the process repeated.

As the process progresses, the respective compartments 5–10 will be populated by successively larger fish. Upon reaching harvesting size, the fish in compartment 10 are removed and the fish from compartment 9 are herded into compartment 10 through opening 16b in a manner hereinbefore described and the fish in compartments 5–8 are likewise transferred in like order. The fish in successive internal compartments are herded into the adjacent larger outer compartment such that upon reaching the innermost compartment 5 same will be emptied and new fingerlings will be placed therein.

The fish may be efficiently fed with the proper nourishment at each stage of growth. It should be apparent that fish may be produced efficiently at a maximum rate while providing a safe and appropriately sized tank for each stage of growth.

It will be seen that I have provided an environment for growing aquatic life forms wherein the growing time may be accurately regulated without manually handling the creatures. Flow rate, temperature and purity of water may be accurately controlled to stimulate growth within a minimum space. The fish or other aquatic animals are provided with the correct volumetric environment at each stage of their growth in concentrically arranged compartments 5–10 between which the fish may be transferred with the least amount of effort and without damage to the fish.

Having described my invention, I claim:

1. Apparatus for raising aquatic life forms comprising: a tank; a plurality of concentric tank walls of progressively larger radius in said tank forming annular compartments of increasing volume, said tank walls inwardly of the outer wall, each having an opening formed therein to allow movement of aquatic life forms between the compartments; a plurality of doors; means pivotally securing a door over each of said openings; said means arranged such that each door pivots inwardly of each compartment to form a transverse barrier between adjacent tank walls.

2. A method of raising aquatic life forms comprising the steps of: providing a plurality of concentrically arranged compartments in a tank, said compartments being progressively greater in volume, there being a door openable between adjacent compartments; circulating water through said compartments; placing small aquatic life forms in the smaller compartment; opening the doors to form a barrier in each compartment to direct the aquatic life forms through the openings provided by said doors; herding the aquatic life forms through the doors as they reach the stage of growth permitted by the volume of the respective compartments from the smallest to the largest; and removing the aquatic life forms from the outermost compartment upon reaching a predetermined size.

* * * * *